July 27, 1965　　　W. F. VERNON, SR　　　3,196,684
INDOOR-OUTDOOR THERMOMETER UNIT FOR AUTOMOBILE WINDOW WING
Filed April 5, 1963　　　　　　　　　　　　2 Sheets-Sheet 2
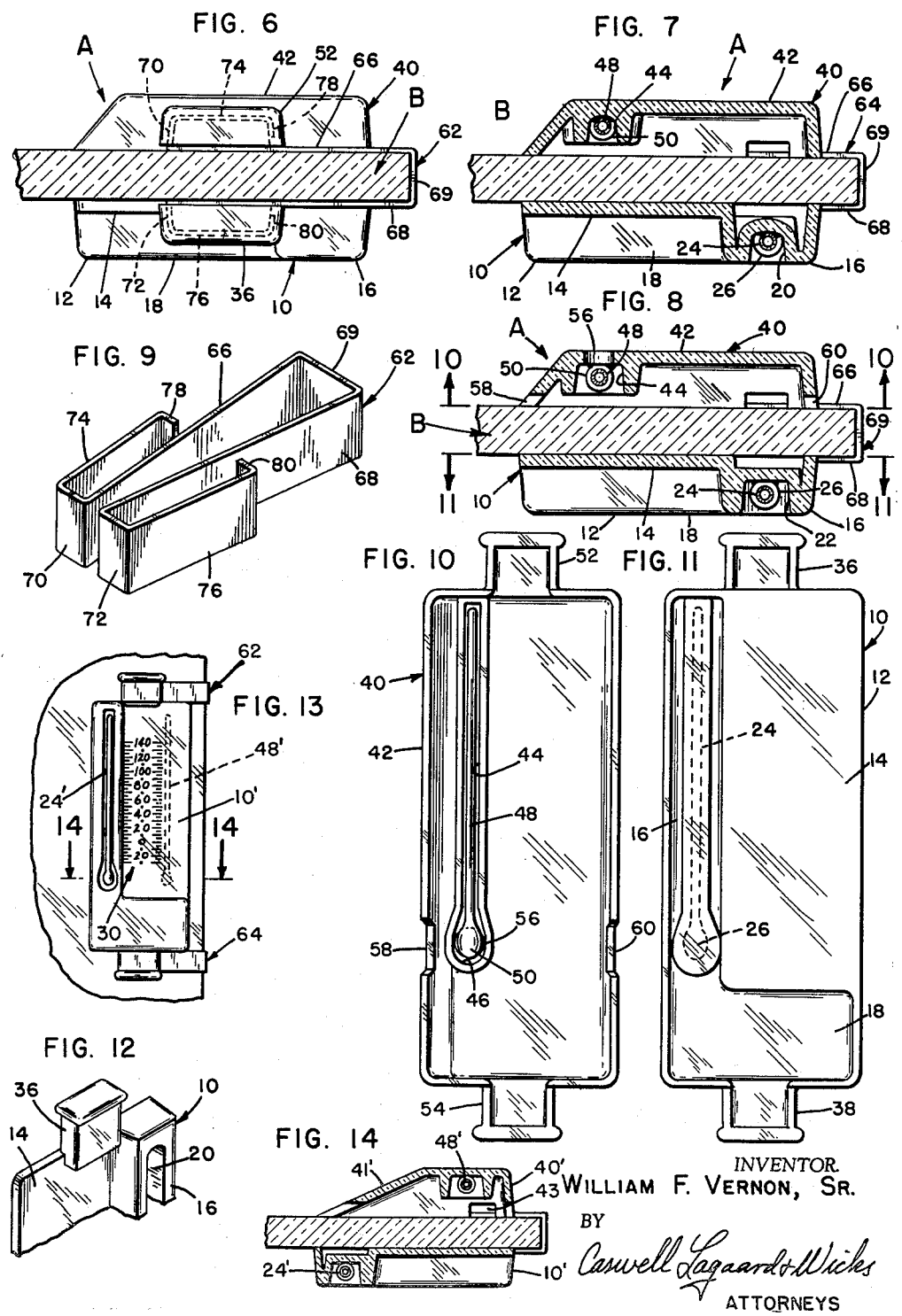
INVENTOR.
WILLIAM F. VERNON, SR.
BY
Caswell Lagaard & Wicks
ATTORNEYS

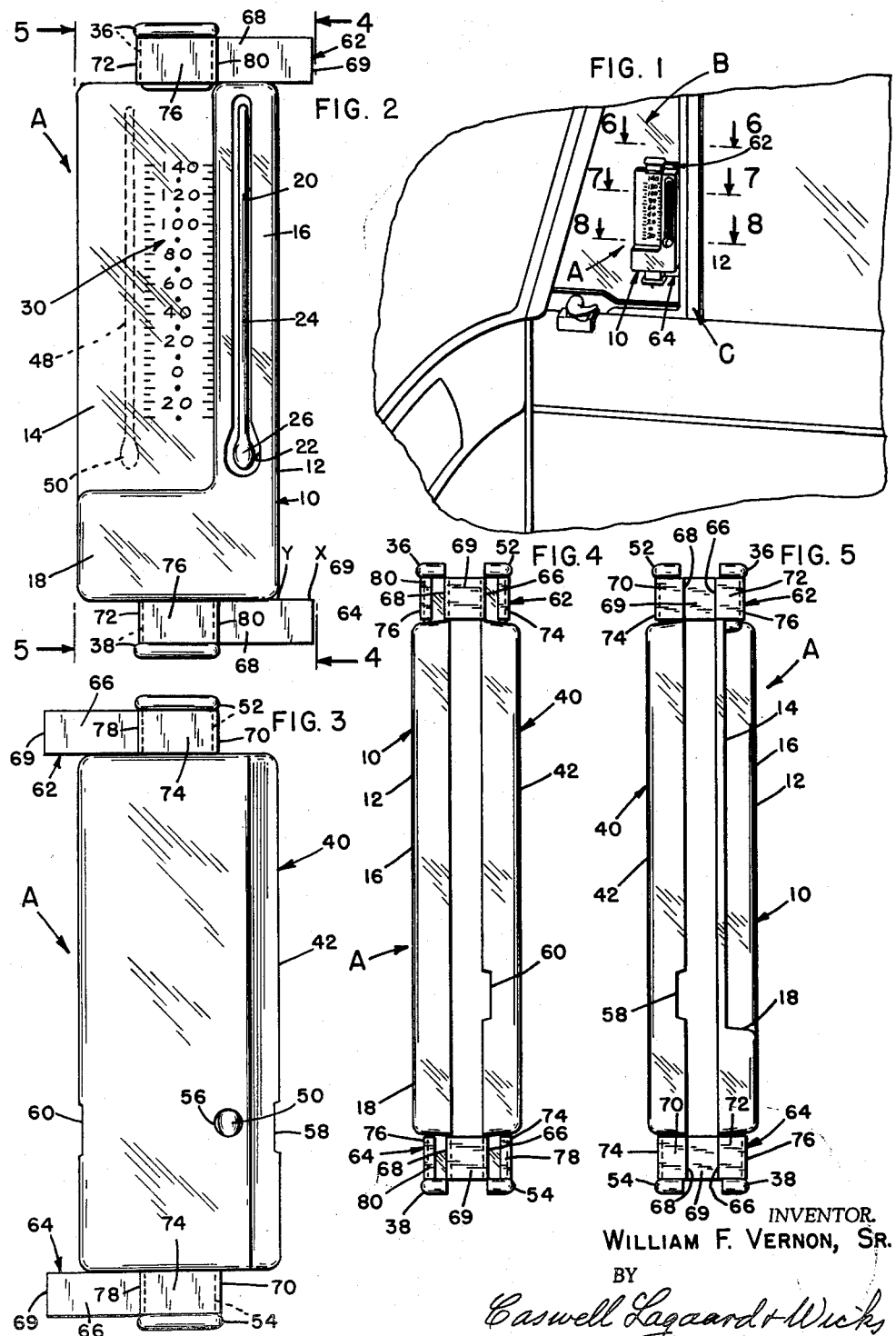

3,196,684
INDOOR-OUTDOOR THERMOMETER UNIT FOR AUTOMOBILE WINDOW WING
William F. Vernon, Sr., Newton, Iowa, assignor to The Vernon Company, Newton, Iowa
Filed Apr. 5, 1963, Ser. No. 270,848
7 Claims. (Cl. 73—340)

The invention relates to an improvement in a thermometer unit for an automobile window from which the temperature outside an automobile and the temperature inside the automobile may both be read.

It is an object of the invention to provide an indoor-outdoor thermometer unit which is mounted on the rear vertical edge of the side window wing of an automobile.

It is a further object to provide an indoor-outdoor thermometer having a thermometer for ascertaining the outside temperature and a thermometer for ascertaining the inside temperature both easily readable in conjunction with a single scale inside the automobile from a single position of the reader.

It is a still further object to provide an indoor-outdoor thermometer for the window of an automobile which may be simply, easily and adjustably mounted on the window wing thereof for positive securement thereto and which does not interfere with the normal closing or opening of the wing.

The temperature differential inside and outside an automobile can be quite important in the case of an air-conditioned automobile and likewise in northern climes where the interior of the car is heated and the temperature outside is on the frigid side.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a perspective view of the thermometer unit in operative position on the side window wing of an automobile, only a portion of the automobile and window being shown.

FIGURE 2 is a front elevational view of the thermometer unit.

FIGURE 3 is a rear elevational view thereof.

FIGURE 4 is a rear edge view of the unit on the line 4—4 of FIGURE 2 without the glass shown.

FIGURE 5 is a front edge view thereof on the line 5—5 of FIGURE 2 with the window glass shown.

FIGURE 6 is a top plan view thereof on the line 6—6 of FIGURE 1.

FIGURE 7 is a sectional view on the line 7—7 of FIGURE 1.

FIGURE 8 is a sectional view of the line 8—8 of FIGURE 1.

FIGURE 9 is a perspective view of a mounting clip removed from the device.

FIGURE 10 is a side view of the outer panel on the line 10—10 of FIGURE 8.

FIGURE 11 is a side view of the inner panel on the line 11—11 of FIGURE 8.

FIGURE 12 is a perspective view of a portion of the top of the inner panel showing in particular the lug with which the mounting clip is engaged.

FIGURE 13 is a front elevational view of a modified form of the thermometer unit mounted on a window wing only a portion of which is shown looking at the same from the inside of the automobile.

FIGURE 14 is a sectional view on the line 14—14 of FIGURE 13.

Referring to the drawings in detail, the thermometer unit A includes the inner panel 10 formed of the substantially rectangular transparent body member 12. The body 12 includes the flat area 14, and the raised vertical border portion 16 which terminates in the raised lower horizontal end portion 18. The vertical portion 16 has formed therein the vertically extending recess 20 including the enlarged recess portion 22 at the lower end thereof, the recess 20 adapted to receive the thermometer 24 and the enlarged recess portion 22 the bulb portion 26 thereof. Formed on the flat area 14 of the inner panel body 12 is the temperature scale indicia 30.

The inner panel body 12 also includes the upper lug portion 36 extending from the upper end thereof and the lower lug portion 38 extending downwardly from the lower end thereof.

The numeral 40 designates an outer panel which is formed of the substantially rectangular transparent body member 42 having the vertically extending recess 44 terminating in the enlarged recess portion 46 at the lower end thereof, the recess portion 44 adapted to receive the thermometer 48 and the enlarged recess portion 46 the bulb portion 50 of the thermometer. The recess 44 allows the thermometer 48 to position below the inner flat surface of the panel 40 which bears flush upon the wing B. It will be seen that the recesses 20 and 44 allow the thermometers 24 and 48, respectively, to be spaced from the window glass member B whereby the temperature of the glass has as little effect on the thermometers as possible.

The upper end of the outer panel body 42 is formed with the lug portion 52 while the lower end is formed with the lug portion 54. The numeral 56 designates an air hole formed in the outer panel body which communicates with the enlarged recess portion 46 in which the thermometer bulb 50 is positioned. The outer panel has formed on the side edges thereof the ventilating holes 58 and 60.

The recess 44 of the outer panel and the thermometer 48 therein are positioned in the panel so that the thermometer 48 is seen from the inside of the automobile through the window wing B and transparent portion 14 of inner panel 10 directly adjacent the scale 30. The transparent portion 14 provides a void through which the thermometer 48 may be viewed. Thus the outer thermometer 48 is read in conjunction with the scale indicia 30, and the inner thermometer 24 is read in conjunction with the same scale indicia 30 when the viewer views the unit A from the inside of the automobile. Both indoor and outdoor temperatures may be read at one time from the inside of the automobile when the unit A is mounted on the window wing B as hereinafter set forth.

For mounting the unit A on the rear vertical edge of the window wing B, a pair of identical upper and lower clips 62 and 64, respectively, are employed. Inasmuch as the clips 62 and 64 are identical only the upper clip 62 will be described in detail. The clip 62 is formed of thin spring stock and includes the side portions 66 and 68 in spaced juxtaposition with the lower ends thereof connected by the short base portion 69 to form a bight or U-shaped clip portion. Extending from the upper ends of the side portions 66 and 68 outwardly of and at right angles thereto are the end portions 70 and 72, respectively. The end portions 70 and 72 terminate in the side arm portions 74 and 76 which overlie the side portions 66 and 68, respectively, in spaced relation. The outer free ends of the arm portions 74 and 76 terminate in the right angular hook end portions 78 and 80, respectively. When the clip 62 is not in operative position on the panels 10 and 40, the side portions 66 and 68 normally converge toward each other to provide clamping action when applied to the panels and the unit is in position on the window wing B as hereinafter described. The length of the side portions 66 and 68 of the clips are of such an extent that when in position on the panels 10 and 40 the outer base portions 69 are spaced outwardly from the side edges of the panels (distance between x and y, FIGURE 2) whereby the outer edges of the panels are thereby positioned inwardly of the edge of the wing B on which the unit A is mounted. As a result of the outer edge of the unit A being positioned inwardly of the edge of the wing, the same does not interfere with contact of the edge of the wing B with window post C.

The clip 62 is mounted on the unit A by springing the arm portions 74 and 76 outwardly so that the upper lug 36 of the inner panel 10 may be gripped between the arm 76 and the side portion 68 and with the upper lug 52 of the outer panel 40 gripped between the arm 74 and the side portion 66 of the clip. The lower clip 64 is mounted on the lower lugs 54 and 38 in the same manner as the upper clip 62.

With both clips, 62 and 64, in place on the panels of unit A, the panels are urged toward each other somewhat in the manner indicated by the clip in FIGURE 9. In this condition, the unit A is forced onto the rear vertical edge of the window wing B and moved into the position illustrated more particularly in FIGURES 6–8 with the end portion 69 of the clips in abutment with the vertical edge of the wing B. The end portions 69 of the clips 62 and 64 are, as heretofore mentioned, of a thin nature and thus do not interfere with the sealing closure of the edge of the wing upon the conventional gasket means of the conventional vertical window post C.

As heretofore mentioned, the inner panel 10 is transparent, and the outer thermometer 48 of the outer panel is visible for reading through the glass wing B and the transparent portion 14 of inner panel 10 in conjunction with the indicia 30. If it is desired to construct the inner panel 10 of an opaque or translucent material and a portion of area 14 thereof removed to form a void or opening adjacent scale 30 in alignment with the outer thermometer, the outer thermometer could then be viewed through the void and read in conjunction with the indicia 30. As one of the benefits of the above thermometer unit, it will be seen that the same may be easily mounted on the wing B and easily removed therefrom together with the feature that it may also be easily adjusted in vertical height on the window wing due to its slidable gripping nature.

In FIGURE 14 is disclosed a modified form of the invention wherein the inside thermometer 24' is at the left of the inner panel 10' instead of the right as previously shown, and the outside thermometer 48' is at the right of the outer panel 40' instead of the left as previously shown, all as viewed in FIGURE 13 in conjunction with FIGURE 14.

The outer panel 40' has an angular leading edge 41' less than 45° as shown in the embodiment of FIGURES 7 and 8 providing less wind resistance, reduction of noise and less collection of debris. The inside thermometer 24' and the outside thermometer 48' are each read in conjunction with the single temperature scale indicia in the same manner as heretofore mentioned with regard to the first embodiment. The outer panel 40' is also provided with the drain hole 43 formed in the bottom thereof.

The invention is not to be understood as restricted to the details set forth since these may be modified within the scope of the appended claims without departing from the spirit and scope of the invention.

Having thus described the invention, what is claimed as new and desired to be secured by Letters Patent is:

1. In an indoor-outdoor thermometer unit for the window wing of an automobile, first panel means mounting a first thermometer on the outer flat surface of an automobile window wing, second panel means for mounting a second thermometer on the inner flat surface of the automobile window wing in horizontal alignment with said first thermometer, a single scale formed on said second panel mounting means adjacent said second thermometer for reading said second thermometer to ascertain the temperature inside the automobile, said second panel mounting means having a transparent portion opposite said first thermometer for viewing said first thermometer therethrough and through the window to read the first thermometer in conjunction with said single scale to determine the temperature outside the automobile and means for mounting said first and second panel means on the window wing of an automobile.

2. In an indoor-outdoor thermometer unit for mounting on the side window wing of an automobile, an inner panel and an outer panel, said inner panel having a first thermometer mounted thereon for registering temperature inside an automobile and a single scale adjacent said thermometer for reading in conjunction therewith, said inner panel having a transparent portion adjacent said scale, said outer panel having a second thermometer mounted thereon for registering temperature outside an automobile, means for mounting said inner panel on the inside flat surface of an automobile window wing and said outer panel on the outside flat surface of the window wing, said second thermometer being positioned on said outer panel in relation to said inner panel so that it is viewable through said transparent portion of said inner panel and readable in conjunction with said single scale of said inner panel for determination of temperature outside the automobile window.

3. The device of claim 2 in which said means for mounting said panels includes a pair of spring clips engaging said panels for pressure engagement of the panels with the automobile window wing to thereby mount the thermometer unit on the window wing.

4. The device of claim 2 in which said panel mounting means includes lugs extending from each end of each of said panels engaged by spring clips.

5. In an indoor-outdoor thermometer unit for mounting on the side window wing of an automobile, an inner panel and an outer panel, said inner panel having a first thermometer for registering temperature inside an automobile and a single scale indicia adjacent said first thermometer for reading in conjunction therewith, said inner panel having a void portion adjacent said scale indicia, said outer panel having a second thermometer mounted thereon for registering temperature outside the automobile, means for mounting said inner panel on the inside flat surface of an automobile window wing and said outer panel on the outside flat surface of the window wing, said second thermometer being positioned on said outer panel in relation to said inner panel so that is viewable through said void portion of aid inner panel and readable in conjunction with said single scale of said inner panel for determination of temperature outside the automobile window.

6. The device of claim 5 in which said outer panel is formed with a recess in which said second thermometer is positioned.

7. In an indoor-outdoor thermometer unit for mounting on a window member, outer panel means, inner panel means, means for mounting said outer panel means on the outer surface of a window member, means for mounting said inner panel means on the inner surface of the window member in juxtaposition to said outer panel means, a single temperature scale for said unit carried by said inner panel means, a first thermometer mounted on said outer panel means, a second thermometer mounted on said inner panel means offset from said first thermometer, said inner panel means having means opposite said first thermometer through which said first thermometer may be viewed for use in conjunction with said single temperature scale, said second thermometer positioned adjacent said single scale for viewing in conjunction therewith.

No references cited.

ISAAC LISANN, *Primary Examiner.*